United States Patent [19]

Tamada

[11] Patent Number: 4,641,753

[45] Date of Patent: Feb. 10, 1987

[54] MAIL SORTING APPARATUS

[75] Inventor: Masuo Tamada, Yokohama, Japan

[73] Assignee: Kabushiki Kaisha Toshiba, Kawasaki, Japan

[21] Appl. No.: 686,402

[22] Filed: Dec. 26, 1984

[30] Foreign Application Priority Data

Dec. 26, 1983 [JP] Japan .................. 58-244084

[51] Int. Cl.$^4$ ............... B07C 1/00; B07C 3/20
[52] U.S. Cl. .................... 209/546; 209/584;
209/900; 364/478; 382/1; 382/57
[58] Field of Search ............... 209/3.1–3.3,
209/546, 547, 569, 583, 584, 900; 101/2;
382/57, 1; 340/825.3; 364/146, 181, 188, 189,
478; 235/462, 463; 400/103; 414/136; 358/903

[56] References Cited

U.S. PATENT DOCUMENTS

| 3,271,738 | 9/1966 | Kamentsky | 382/57 |
| 3,582,884 | 6/1971 | Shepard | 340/825.3 X |
| 4,027,142 | 5/1977 | Paup et al. | |
| 4,205,780 | 6/1980 | Burns et al. | |

FOREIGN PATENT DOCUMENTS

| 1264842 | 3/1956 | Fed. Rep. of Germany | |
| 1275122 | 9/1965 | Fed. Rep. of Germany | |
| 2945386 | 5/1980 | Fed. Rep. of Germany | 209/584 |
| 2255966 | 7/1975 | France | |
| 53-76631 | 7/1978 | Japan | 382/1 |

OTHER PUBLICATIONS

"A New Postal Technique: Video Coding", M. Bordes l'Echo des Recherches, No. 78, pp. 42–49, Oct. 1974.

Primary Examiner—David A. Scherbel
Assistant Examiner—Edward M. Wacyra
Attorney, Agent, or Firm—Cushman, Darby & Cushman

[57] ABSTRACT

An apparatus for sorting mail is disclosed. In the apparatus, a readout section reads out destination data on mail. A discriminating section discriminates the destination data on the basis of the result of readout by the readout section. A plurality of coding desks each include a display section for displaying the readout result by the readout section when the discriminating section fails to discriminate the destination data, and a keyboard for enabling the destination data corresponding to the contents of display by the display section to be input. The plurality of coding desks are assigned to regions or cities. A distributing section distributes the readout result by the readout section to coding desks corresponding to regions or cities as recognized from part of the address data when the discriminating section fails to discriminate the destination data. A sorting data assigning section assigns to the mail the sorting data according to the result of discriminating operation by the discriminating section or the destination data by the keyboards of the coding desks. A sorting/collecting section sorts and collects the mail into predetermined sorting sections according to the sorting data applied by the sorting data assigning section.

3 Claims, 8 Drawing Figures

MAIL SORTING APPARATUS

BACKGROUND OF THE INVENTION

This invention relates to an apparatus for sorting mail, and more particularly, to an apparatus for sorting mail according to bar codes which are assigned to the mail according to the results of reading out an address on the mail or codings.

In a recent mail sorting apparatus, through optical scanning, the address is correctly read out, and a bar code corresponding to the address is assigned to the mail. On the other hand, when the address is incorrectly read out, the result of the readout from the scanned image data is displayed by a display unit of a coding system. An operator, after seeing the display, keys in the address data to assign a bar code to the mail by a keyboard of the coding system. The mail bearing bar codes assigned in this way are sorted and put into corresponding sorting boxes according to the result of the readout or the coding.

The mail sorting apparatus described above has a drawback. When one operator is assigned to code the addresses in a state having a large area and thus consisting of many postal zones, he or she needs to consult a thick address directory or several directories to ascertain which postal zone this or that block belongs to. Consulting a thick directory or many directories is very time-consuming. Therefore, the coding efficiency is inevitably low.

SUMMARY OF THE INVENTION

It is, therefore, an object of the present invention to provide a new and improved apparatus for sorting mail which can improve a coding efficiency.

According to the present invention, there is provided an apparatus for sorting mail comprising readout means for reading out destination data on mail, discriminating means for discriminating the destination data on the basis of the result of readout by the readout means, a plurality of coding desks each including display means for displaying the readout result by the readout means when the discriminating means fails to discriminate the destination data, and a keyboard for enabling the destination data corresponding to the contents of display by the display means to be input, the plurality of the coding desks being assigned to regions or cities, distributing means for distributing the readout result by the readout means to the coding desks corresponding to regions or cities as recognized from part of the address data when the discriminating means fails to discriminate the destination data, sorting data assigning means for assigning to the mail the sorting data according to the result of discriminating operation by the discriminating means or the destination data by the keyboards of the coding desks, and sorting/collecting means for sorting and collecting the mail into predetermined sorting sections according to the sorting data applied by the sorting assigning means.

With this arrangement, groups of coding desks are alloted to regions or cities, respectively. When the destination data can not be recognized, the readout data are distributed to the display means of the coding desks allotted to the regions or cities as recognized from part of the unrecognized destination data. This feature remarkably improves the coding efficiency.

BRIEF DESCRIPTION OF THE DRAWINGS

These and other objects and features of the present invention can be understood by reference to the accompanying drawings, in which.

DETAILED DESCRIPTION OF THE PREFERRED EMBODIMENT

An embodiment of a mail sorting apparatus according to the present invention will be described referring to the accompanying drawings.

Figure 1:
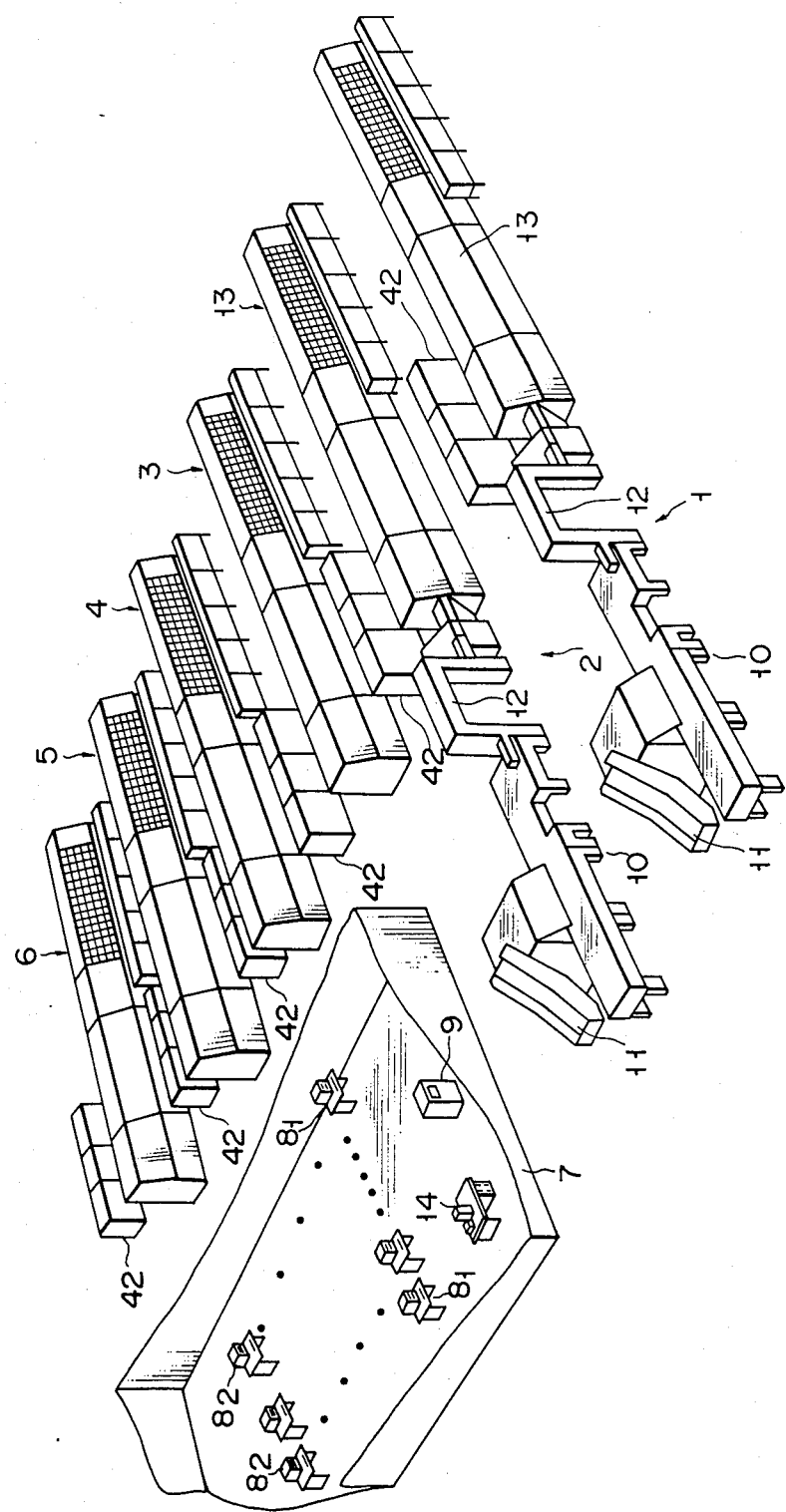
FIG. 1 shows a scheme of a mail processing system into which the present invention is applied as an embodiment.

FIG. 1 illustrates a layout of a mail processing system when mail sorting apparatuses according to the present invention are installed. In the figure, reference numerals 1 and 2 designate mail sorters coupled with select/stamper sections. Numerals 3–6 designate mail sorters not coupled with select/stamper sections. A coding room 7 is composed of a plurality of video coding desks $8_1$, $8_2$, ..., a distributor 9, and a data processor 14.

In the mail sorters 1 and 2, a select/stamper 10 selects small ordinary mail, which can be handled for sorting by the machine, i.e., the mail sorting apparatus, from mail P (see FIG. 2) fed to a mail feeder 11, and aligns the orientation of the selected mail on the basis of locations of the postage stamps, stamps the mail, and finally feeds the stamped mail to a coupler 12. The coupler 12 couples the select/stamper 10 with a read/sorter 13.

The read/sorters 13 and 13 in the mail sorters 1 and 2 are respectively primary and secondary switch sorters. Mail sorters 3–5 are for primary sorting, and a mail sorter 6 is for secondary sorting. Reference numerals 42, 42, ..., 42 are control units for controlling the mail sorters 1–6.

Figure 2:
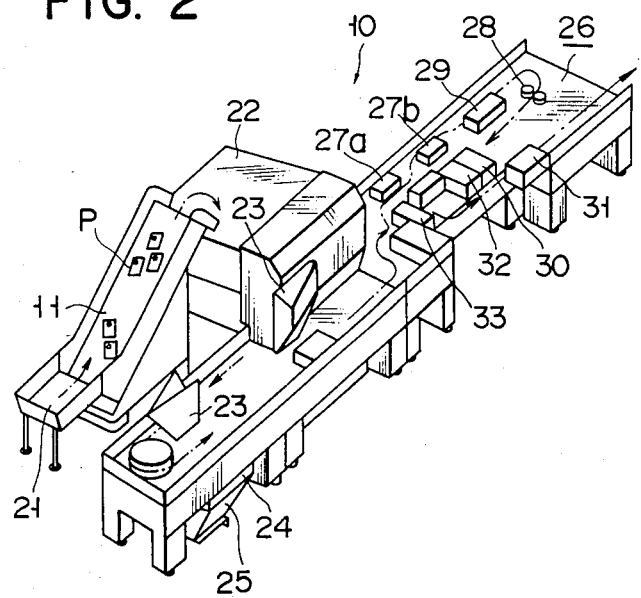
FIG. 2 shows a perspective view of a select/stamper section used in the system of FIG. 1.

The select/stamper 10 will be described in FIG. 2. In the select/stamper 10, a mail feeder 11 picks up mail P received by the receptacle 21 for mail, and transfers them upwardly toward the thickness selector 22, while uniformly scattering the mail on the surface of the mail feeder 11. A thickness selector 22 selectively removes the mail P other than regular form mail (referred to as irregular form mail), which has the more thickness than a predetermined thickness. For the selective removal of the mail, a known nail belt type selecting system is employed in this embodiment. Width selectors 23 and 23 are provided for selecting the irregular mail P with the thickness thicker than a predetermined width and for removing all of the mail unsuitable for the machine handling in the succeeding stage of mailing/sorting processing. The irregular mail P removed by the thickness selector 22 and the width selectors 23 and 23 are led downwardly to a transfer section 24 and a shooter 25.

The mail P passed through the width selectors 23 and 23 are taken out one by one by a single mail takeout section (not shown) and is transferred to an alignment/stamper 26. In the alignment/stamper 26, a postage stamp on each mail is detected by stamp detectors 27a and 27b of the color sensing type. The mail P is stamped by a stamping mechanism 28 on the basis of the position of the detected postage stamp. Further, a switchback mechanism 29 aligns the orientation of the mail also on the basis of the stamp position. Of the regular mail P as stamped, special mail are collected into a special delivery collector 30. The remaining mail P are transferred toward the coupler 12. An ordinary mail collector 31 is used when the select/stamper 10 is solely used, not coupled with the coupler 12, or when trouble occurs somewhere in the succeeding stage of the mail sorting system. In this case, the ordinary mail collector 31 collects the ordinary mail P by the ordinary mail collector 31 itself. Reference numeral 32 designates a reject collector. A manual feeder 33 directly feeds previously selected regular mail P to the alignment/stamper 26.

The coupler 12 coupled with the select/stamper 10 thus arranged is a known buffer stacker. The stamped regular mail P as transferred from the select/stamper 10 is reliably fed one by one to the read/sorter 13, corresponding to the processing ability of the read/sorter 13. The coupler 12 also stores excessive mail above a predetermined number of supplied mail.

The read/sorter 13 will be described in FIGS. 3 and 4. The read/sorter 13 is composed of an image reader 41, a control unit 42, a delay/print section 43, and a sorting section 45. The image reader 41 converts optical destination information, or address information, on a mail P into electrical image information, and contains an optical character reader and an image pickup. The control unit 42 is coupled with a discriminator 91 (FIG. 6) for discriminating the address information from the image information read by the image reader 41 (see FIGS. 1 and 6). The delay/print section 43 delays the incoming mail P from the image reader 41, and prints on the mail P a bar code (sorting data) according to the discrimination result by the discriminator 91 and the address information encoded by the video coding desks $8_1, 8_2, \ldots$. The sorting section 45 sorts the mail according to the bar codes printed thereon and distributes them into sorting boxes 44.

Figure 3:
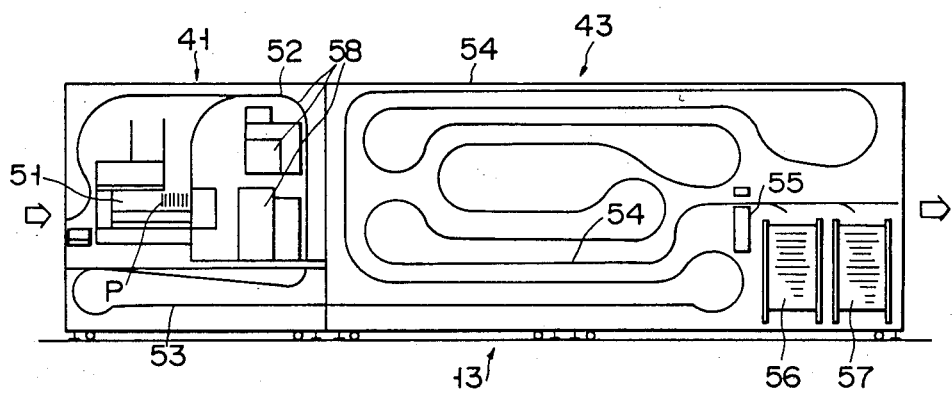
FIG. 3 shows a plan view illustrating an arrangement used in the system of FIG. 1.

The image reader 41 and the delay/print section 43 are arranged as shown in FIG. 3. The mail P fed from a feed section 51 or the mail P transferred from the coupler 12 is transferred on a transfer path 52. An image reader 58 reads the information on the mail P transferred on the transfer path 52 by the optical scanner. The mail P passed through the image reader 58 is supplied through a transfer path 53 and a delay/transfer path 54 to the sorting section 45 (FIG. 4). On the terminal portion of the delay/transfer path 54, a printer 55 and stackers 56 and 57 are disposed. The printer 55 prints on the mail P a bar code representing the address information.

Figure 4:
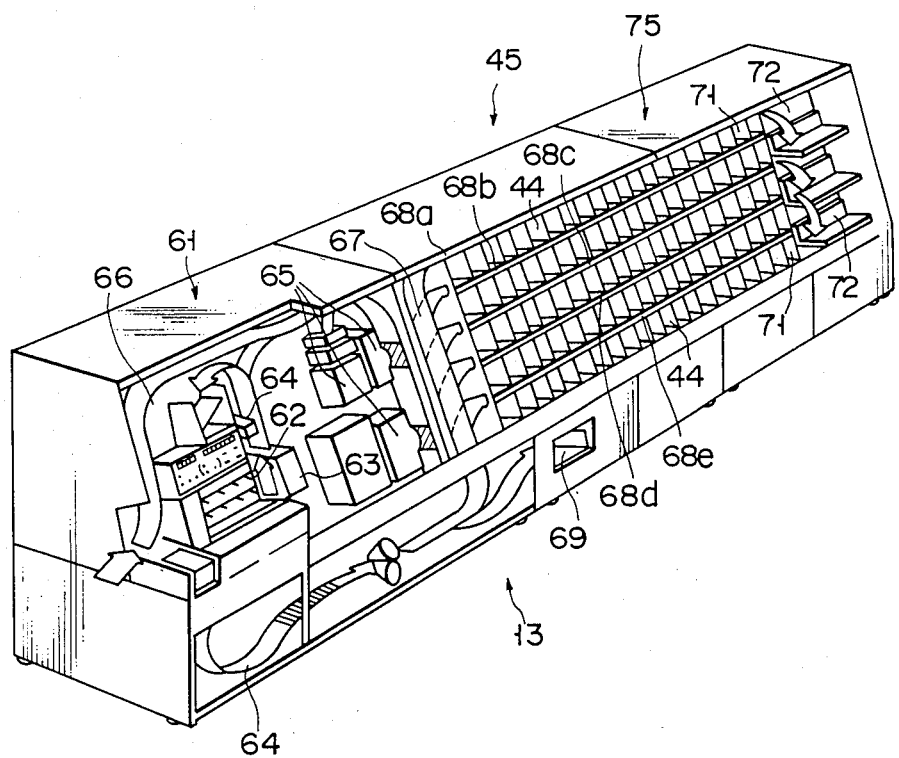
FIG. 4 shows a perspective view of a sorting section used in the system of FIG. 1.
Figure 5:
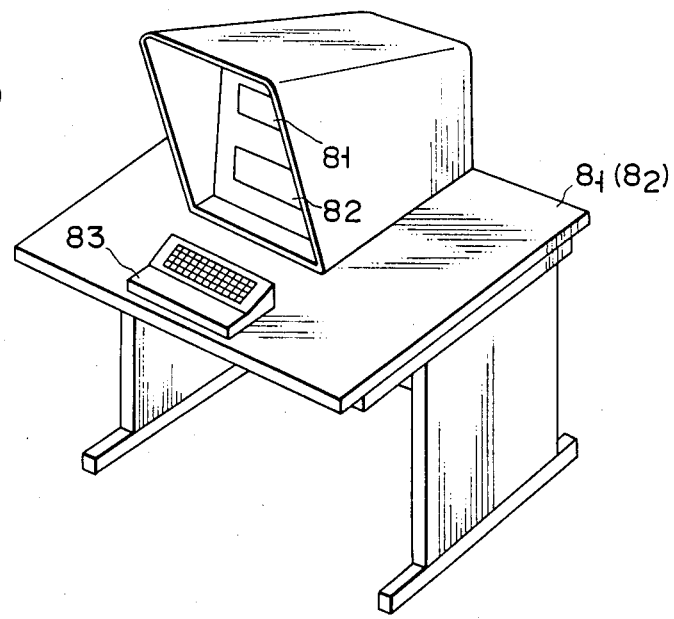
FIG. 5 shows a perspective view illustrating an outer appearance of a video coding desk used in the system of FIG. 1.

The sorting section 45 is arranged as shown in FIG. 4. A feed/read section 61 contains a feeder 62 for setting the mail P printed with bar codes together upstanding. The mail P stored in the feeder 62 are successively and upwardly taken out sheet by sheet. In this case, the endmost mail P is first taken out. The mail P taken out are transferred through a takeout transfer path 64 toward a sorter 75 for collecting and sorting. On the way to the takeout transfer path 64, a reader 65 is disposed, which reads the bar code on the mail P being transferred on the transfer path. The takeout transfer path 64 merges at the starting point with a transfer path 66 for carrying out the mail P emanating from the delay/print section 43. The mail P is then sent to the takeout transfer path 64.

The takeout transfer path 64 connects at the end with a vertical sorting transfer path 67. The mail P are selectively directed by a gate mechanism (not shown) to give horizontal sorting transfer paths 68a-68e vertically stacked or to an exit pocket 69. The gating by the gate mechanism is controlled on the basis of the readout result of the reader 65. In the starting end portion of the horizontal sorting transfer paths 68a-68e, a number of sorting boxes 44, for example, 22 boxes, are disposed under the lower sides of the horizontal sorting transfer paths 68a-68e. Closer to the end portion of the horizontal sorting transfer paths 68a-68e, a single auxiliary collector box 71 and a removal mail collector box 72 are disposed correspondingly.

Further, the remaining mail sorters 3–6 each have the same read/sorter 13 as that of each of the mail sorters 1 and 2.

The video coding desks $8_1, 8_2, \ldots$, are composed of CRT displays 81 and 82 for displaying the image information supplied through the distributor 9 from the control unit 42, and a keyboard 83 for keying in address information corresponding to the image information displayed by the CRT display 81. The image data as divided and alloted to regions or towns and cities are assigned to the video coding discs $8_1, 8_2, \ldots,$ to $8_n, \ldots$, respectively.

Figure 6:
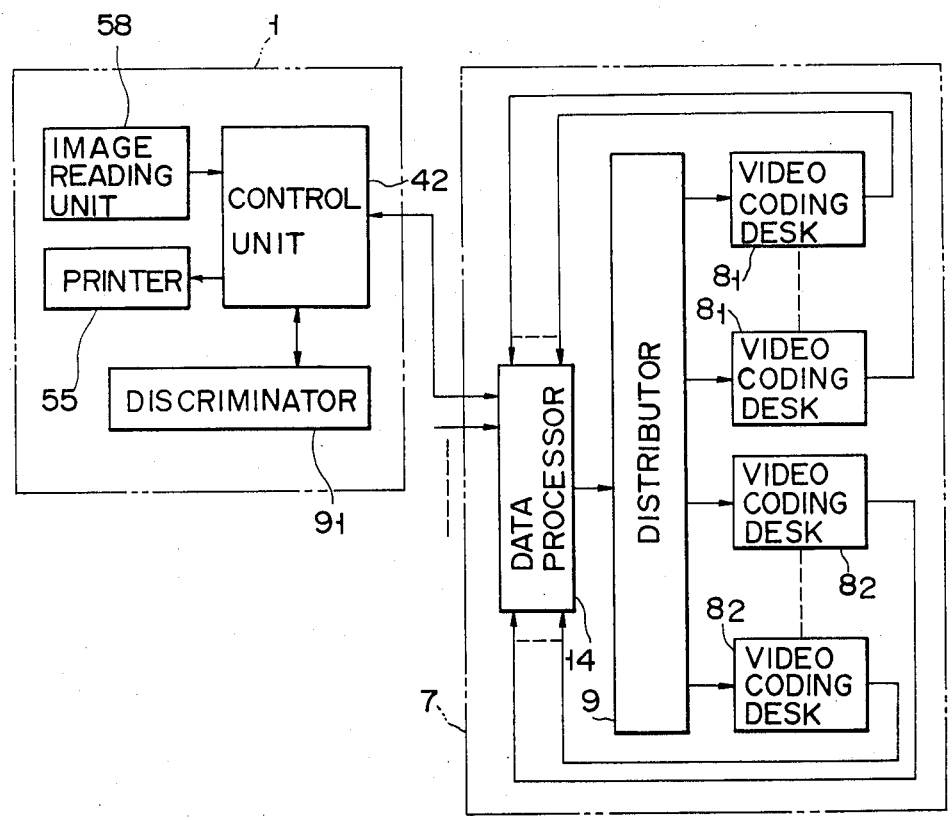
FIG. 6 shows a configuration of a major part of an electric circuitry used in the embodiment.

A major portion of the electrical circuitry contained in the mail sorting apparatus is shown in FIG. 6. The control unit 42 provided in the read/sorter 13 of the mail sorter 1 reads the image information on each mail P as fed from the image reader 58, to cause a discriminator 91 to discriminately recognize the address information. The control unit 42 further supplies to the printer 55 the bar code data representing the address data discriminated or the bar code data supplied from the data processor 14. Upon receipt of the bar code data, the printer 55 prints the bar code on the corresponding mail P. When the discriminator 91 fails to discriminately recognize the address data, the control unit 42 supplies the image data to the data processor 14. The electrical circuitry of each of the remaining mail sorters 2–6 has substantially the same arrangement as that mentioned above.

The data processor 14 drives the distributor 9 to distribute the supplied image data to the respective video coding desks $8_1, 8_2, \ldots$. Specifically, the image data are distributed to different groups of video coding desks $8_1, 8_2, \ldots,$ to $8_n$ respectively provided for regions or towns and cities. The data processor 14 converts the address data from each of the video coding desks $8_1, 8_2, \ldots$ into corresponding bar code data, and supplies the bar code data to the control unit 42 of the corresponding mail sorter 1.

The operation of the mail sorting apparatus thus arranged will be described. Firstly, a mail P is fed to the mail feeder 11. Then, the select/stamper 10 selects from those mail supplied to the mail feeder 11, small ordinary mail P which can be processed by the mail sorter. By the select/stamper 10, the selected mail P are aligned in orientation on the basis of the positions of the postage stamps as detected. Further, these mail P are stamped. The mail P from the select/stamper 10 is transferred through the coupler 12 to the read/sorter 13, viz., the image reader 41. In the image reader 41, the mail P supplied from the coupler 12 or the mail P taken out of the feed section 51 is transported on the transfer path 52. During the transportation, the picture information on the moving mail P is optically read out by the image reader 58. The result of the readout is supplied to the control unit 42. Then, the control unit 42 checks whether the image data picked up is written by alphabet or Chinese letters by the discriminator 91. If it is Chinese letters written address data, it further checks whether or not that data can be recognized. If the image data is written in Chinese letters and the Chinese letters written address can be recognized, the control unit 42 directly converts the address data into the corresponding bar code. At this time, the mail P is passed through the image reader 58, and is transported by the transfer paths 53 and 54. After a predetermined time, the mail P reaches the printer 55.

When the discriminator 91 discriminately recognizes the upper order data of the image data, viz., the data representing regions, towns and cities, the control unit 42 transfers the regional and urban data and the image data as well to the data processor 14. Upon receipt of the data, the data processor 14 distributes by the distributor 9, the image data as transferred to the groups of the video coding desks $8_1, 8_2, \ldots,$ to $8_n, \ldots$ according to the regional and urban data. Then, in groups of video coding desks $8_1, 8_2, \ldots,$ to $8_n, \ldots,$ the image data of specific regions or specific cities are displayed by the CRT displays 82. After seeing the image data, operators respectively key in the address data corresponding to the displayed image data through the keyboard 83. The address data keyed in by the keyboard 83 are supplied to the data processor 14. Upon receipt of the data, the data processor 14 converts the address data into a bar code. The bar code is then applied to the control unit 42. If the contents of the alphabet and Chinese letters data are identical with each other, the same bar code is produced. Then, the control unit 42 connects to the printer 55 the bar code data supplied from the data processor 14 according to the keyed in data, or the bar code directly converted from the address data as mentioned above. At this time, if the mail P of which the address data is read out and reaches the printer 55, the bar code is printed on the mail P. The mail P bearing the printed bar code is supplied to the sorting section 45.

In the sorting section 45, the mail P bearing the bar code, which is supplied from the delay/print section 43 or taken out from the feeder 62, is transported on the takeout transfer path 64. The bar code on the mail P being transported on the takeout transfer path 64 is optically read out by the reader 65. The mail P is then directed to the corresponding sorting box 44 on the basis of the result of readout by the reader 65.

The above-mentioned operation is correspondingly applied that the mail P are sorted by the mail sorters 2-6. Of those sorters, the sorters 3-6 perform the operation following the selection and stamping of the mail.

As described above, the specific regional or urban image data alone are displayed by coding desks, respectively. Therefore, the required keying in data are only the lower address data in specific regions or cities. This indicates ease of understanding the address data, and remarkable improvement of the coding efficiency.

While the above-mentioned embodiment is applied to the address data expressed in the alphabet and Chinese letters, the present invention is applied for the address data written by the combination of other types of characters, for example, alphabet and Arabic.

Figure 7:
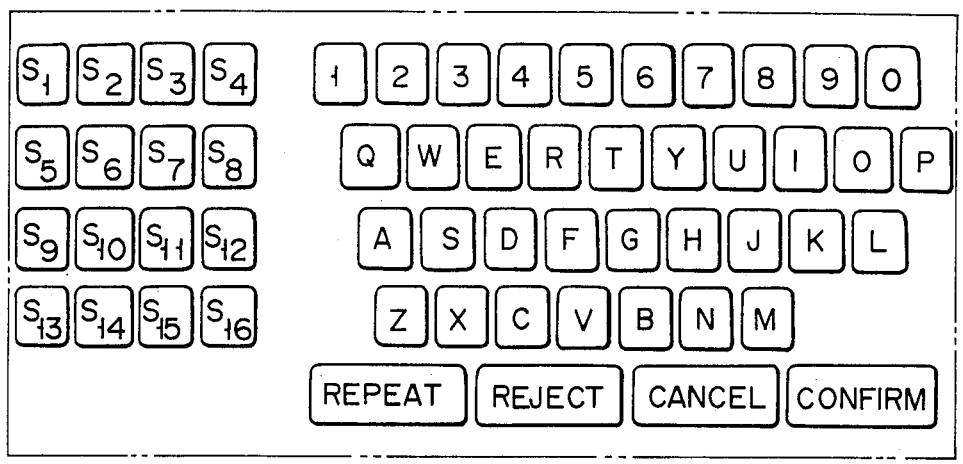
FIGS. 7 and 8 show layouts of a video coding desk shown in FIG. 5, and another coding desk, respectively.
Figure 8:
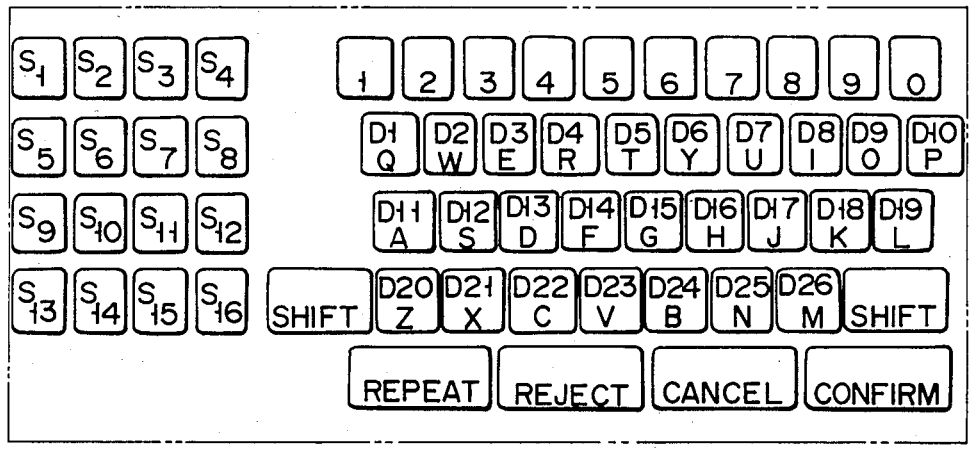

In the above-mentioned embodiment, the input data by the keyboard as shown in FIG. 7 are only the lower order address data in cities and regions. Alternatively, names of buildings and companies, which are specifically associated with the address data, respectively, may be input by means of a key board as shown in FIG. 8.

The keyboard of a coding desk should be suitable for the input of extracted address information. Two recommended keyboards are shown in FIGS. 7 and 8. The first keyboard has the standard layout and comprises 10 numeral keys, 26 alphabet keys, 16 substitution keys and 4 function keys. Numeral keys are used to input the street number. Alphabet keys are used to input characters of the street name. Substitution (S) keys represent a character string, a word, a whole street name or a final destination and their correspondences are software programmable. The Cancel key enables keyed-in data sequences to be cleared as long as they are not confirmed. The Repeat key provides for a mail piece with the same address information as was assigned to the previous mail piece. The Reject key is used when the address information on the mail surface cannot be recognized. The Confirm key enables keyed-in address information to be assigned to the mail piece and to go on to the next address coding.

In the second keyboard, an additional function for designating one of the delivery offices or specified firms or buildings is provided. The Shift key as function enables designation of the delivery office or specified firms or buildings when keyed-in together with one of the alphabet keys which corresponds to the delivery office or specified firms or buildings.

As seen from the foregoing, the present invention provides a mail sorting apparatus capable of improving the coding efficiency.

What is claimed is:

1. An apparatus for sorting mail, comprising:
    readout means for reading out destination data on mail;
    discriminating means for discriminating the destination data based on the result of the readout operation of the readout means such that an upper order address data and a lower order address data contained in the destination data are discriminated separately;
    first control means receiving the output signals of the discriminating means and the readout means so as to generate a first sorting data corresponding to the destination data when both upper and lower order address data have been discriminated and to produce the upper order address data and the readout result when the upper order address data only has been discriminated;
    a plurality of video coding desks each including display means and a keyboard, and assigned to predetermined regions or cities;
    distributing means for distributing the destination data from the readout means to the corresponding video coding desk according to the discriminated upper order address data so as to display the destination data on the display means of the video coding desk and to enable the keyboard of the video coding desk to input correct lower order address data based on the display;

second control means for generating a second sorting data corresponding to the upper order address data distributed to the corresponding video coding desk, and the lower order address data inputted from the keyboard of said video coding desk;

sorting data assigning means for assigning to the mail the first or second sorting data generated from the first or second control means; and sorting/collecting means for sorting and collecting said mail into predetermined sorting sections according to the sorting data applied by said sorting data assigning means.

2. The apparatus according to claim 1, wherein said first and second sorting data are in the form of a bar code.

3. The apparatus according to claim 1, wherein at least one of said keyboards of the plurality of video coding desks permits the names of buildings and companies to be input as the lower order address data.

* * * * *